United States Patent [19]

Shibue et al.

[11] Patent Number: 5,685,556
[45] Date of Patent: Nov. 11, 1997

[54] VEHICLE SUSPENSION HAVING BUSHINGS WITH DIFFERENT RIGIDITIES

[75] Inventors: Hideaki Shibue; Toshiharu Yoshioka; Hideki Mizutani, all of Saitama, Japan

[73] Assignee: Honda Giken Kogyo Kabushiki Kaisha, Tokyo, Japan

[21] Appl. No.: 587,902

[22] Filed: Jan. 16, 1996

[30] Foreign Application Priority Data

Jan. 17, 1995 [JP] Japan ................... 7-005176

[51] Int. Cl.⁶ ............................................. B60G 3/00
[52] U.S. Cl. .................. 280/690; 280/701; 280/725; 280/673; 280/688
[58] Field of Search ........................ 280/690, 701, 280/697, 691, 696, 692, 724, 725, 726, 673, 675, 688, 716, 663, 666; 267/293, 292, 248, 141.2

[56] References Cited

U.S. PATENT DOCUMENTS

| | | | |
|---|---|---|---|
| 3,892,284 | 7/1975 | Braess et al. | 280/663 |
| 4,466,635 | 8/1984 | Okada et al. | 280/690 |
| 4,529,221 | 7/1985 | Kijima et al. | 280/690 |
| 4,621,830 | 11/1986 | Kanai | 280/690 |
| 4,957,308 | 9/1990 | Takizawa | 280/701 |
| 5,362,093 | 11/1994 | Klosterhuber et al. | 280/716 |

FOREIGN PATENT DOCUMENTS

| | | | |
|---|---|---|---|
| 2311480 | 9/1974 | Germany | 280/716 |
| 63-270209 | 11/1988 | Japan | 280/688 |
| 63-270210 | 11/1988 | Japan | 280/688 |

*Primary Examiner*—Richard M. Camby
*Assistant Examiner*—Peter C. English
*Attorney, Agent, or Firm*—Weiner, Carrier, Burt & Esser, P.C.; Joseph P. Carrier; Irving M. Weiner

[57] ABSTRACT

In a suspension system, a trailing arm and a knuckle are interconnected by a first rubber bush joint located in front of and below an axle, a second rubber bush joint located above the axle, and a third rubber bush joint located in back of and below the axle. Each of the rubber bush joints has a characteristic such that it is soft in a direction of an axis thereof and hard in a direction perpendicular to the axis in order to ensure a longitudinal compliance. The rigidity of the first rubber bush joint in the direction perpendicular to its axis is set lower than that of the third rubber bush joint in the direction perpendicular to its axis in order to produce inward towing of the outer wheel as viewed in the turning direction. Rear sides of the axes of the second and third rubber bush joints are inclined outwardly of the vehicle body in order to generate inward towing during braking. Thus, it is possible to insure a high longitudinal compliance to provide an excellent stability during turning and during braking of the vehicle.

15 Claims, 6 Drawing Sheets

VEHICLE SUSPENSION HAVING BUSHINGS WITH DIFFERENT RIGIDITIES

BACKGROUND OF THE INVENTION

1. Field of the Invention

The present invention relates to a suspension system for a vehicle, including a knuckle for rotatably supporting a wheel through an axle, a suspension member for connecting a vehicle body to the knuckle, and buffer means for buffering vertical movement of the suspension member.

2. Description of Relevant Art

A semi-trailing arm type suspension is known having a trailing arm in which a front portion of the trailing arm is vertically pivotally supported around an axis inclined with respect to a lateral direction of the vehicle body, and a rear portion of the trailing arm is connected to the knuckle. The known suspension is of a compact structure having a reduced number of parts and a reduced number of mounting points to the vehicle body and hence, is advantageous for effectively utilizing an accommodation space.

The known semi-trailing arm type suspension has a problem that, during turning of the vehicle, an outer wheel as viewed in a turning direction, to which a large side force is applied, is towed outwardly, because the mounting points of the trailing arm to the vehicle body are disposed in front of the axle of the vehicle. Also, there is another problem that, during braking, the left and right wheels are towed outwardly by a braking force applied to the wheels, because the mounting points of the trailing arm to the vehicle body are disposed at an inner portion of the vehicle body than the mounting points to the wheels. For this reason, it is difficult to ensure a stability. The known semi-trailing arm type suspension is also accompanied by a problem of a bad riding comfort due to an insufficient longitudinal compliance. A torsion beam type suspension has similar problems.

SUMMARY OF THE INVENTION

Accordingly, it is an object of the present invention to provide a suspension system for a vehicle, wherein the above-described problems can be overcome.

To achieve the above object, according to a first aspect and feature of the present invention, there is provided a suspension system for a vehicle, comprising: a knuckle for rotatably supporting a wheel through an axle; a suspension member for connecting a vehicle body to the knuckle; and buffer means for buffering vertical movement of the suspension member, wherein the knuckle is connected to the suspension member by at least one elastomeric bush or bushing disposed in front and at least one elastomeric bush or bushing disposed in back of the axle, axes of the at least two bushes being disposed to extend substantially in a longitudinal direction of the vehicle body as viewed in a side direction, a rigidity of the elastomeric bush disposed in back of the axle in a direction perpendicular to an axis of the elastomeric bush being set higher than that of the elastomeric bush disposed in front of the axle in a direction perpendicular to an axis of the elastomeric bush. As used herein the terms "bushing" and "bush" are used interchangeably.

With the aforementioned first feature of the present invention, when an impact directed rearwardly of the vehicle body is applied to the wheel due to an unevenness of a road surface or the like, the knuckle can be moved relative to the suspension member by the deformation of the elastomeric bushes and hence, a longitudinal compliance is ensured to provide an enhanced riding comfort. When the vehicle is turned, a side force is applied to an outer wheel as viewed in the turning direction from the outside to the inside of the vehicle, while a side force is applied to an inner wheel as viewed in the turning direction from the inside to the outside of the vehicle. However, the soft elastomeric bush disposed in front of the axle is deformed to a larger extent than the hard elastomeric bush disposed in back of the axle by such side force, whereby the outer wheel is towed inwardly, and the inner wheel is towed outwardly. Thus, both of the outer and inner wheels are steered in the turning direction to provide an enhanced stability.

According to a second aspect and feature of the present invention, in addition to the first feature, an axial rigidity of each of the at least two elastomeric bushes is set lower than the rigidity in the direction perpendicular to the axis.

With the second feature of the present invention, when an impact directed rearwardly of the vehicle body is applied to the wheel, the elastomeric bushes are axially deformed to ensure a sufficient longitudinal compliance, leading to a further enhanced riding comfort.

According to a third aspect and feature of the present invention, in addition to the first feature, the elastomeric bush disposed in back of the axle has an axis which is set such that a rear side of the axis is inclined outwardly of the vehicle body as viewed in a plane.

With the third feature of the present invention, when a braking force directed rearwardly of the vehicle body is applied to the wheel by brig, the elastomeric bush disposed in an inclined manner in back of the axle is deformed outwardly of the vehicle body, thereby producing an inward towing to ensure a stability during braking.

According to a fourth aspect and feature of the present invention, in addition to the first feature, the two elastomeric bushes disposed in front and in back of the axle are located below the axle, and the suspension system further includes another elastomeric bush or bushing mounted above the axle and having an axis which is directed in the longitudinal direction of the vehicle body as viewed from a side.

With the fourth feature of the present invention, it is possible to enhance the camber rigidity of the wheel by the third elastomeric bush, while ensuring a good riding comfort.

The above and other objects, features and advantages of the invention will become apparent from the following detailed description of the preferred embodiments taken in conjunction with the accompanying drawings.

DETAILED DESCRIPTION OF THE PREFERRED EMBODIMENTS

The present invention will now be described by way of preferred embodiments with reference to the accompanying drawings.

Figure 1:
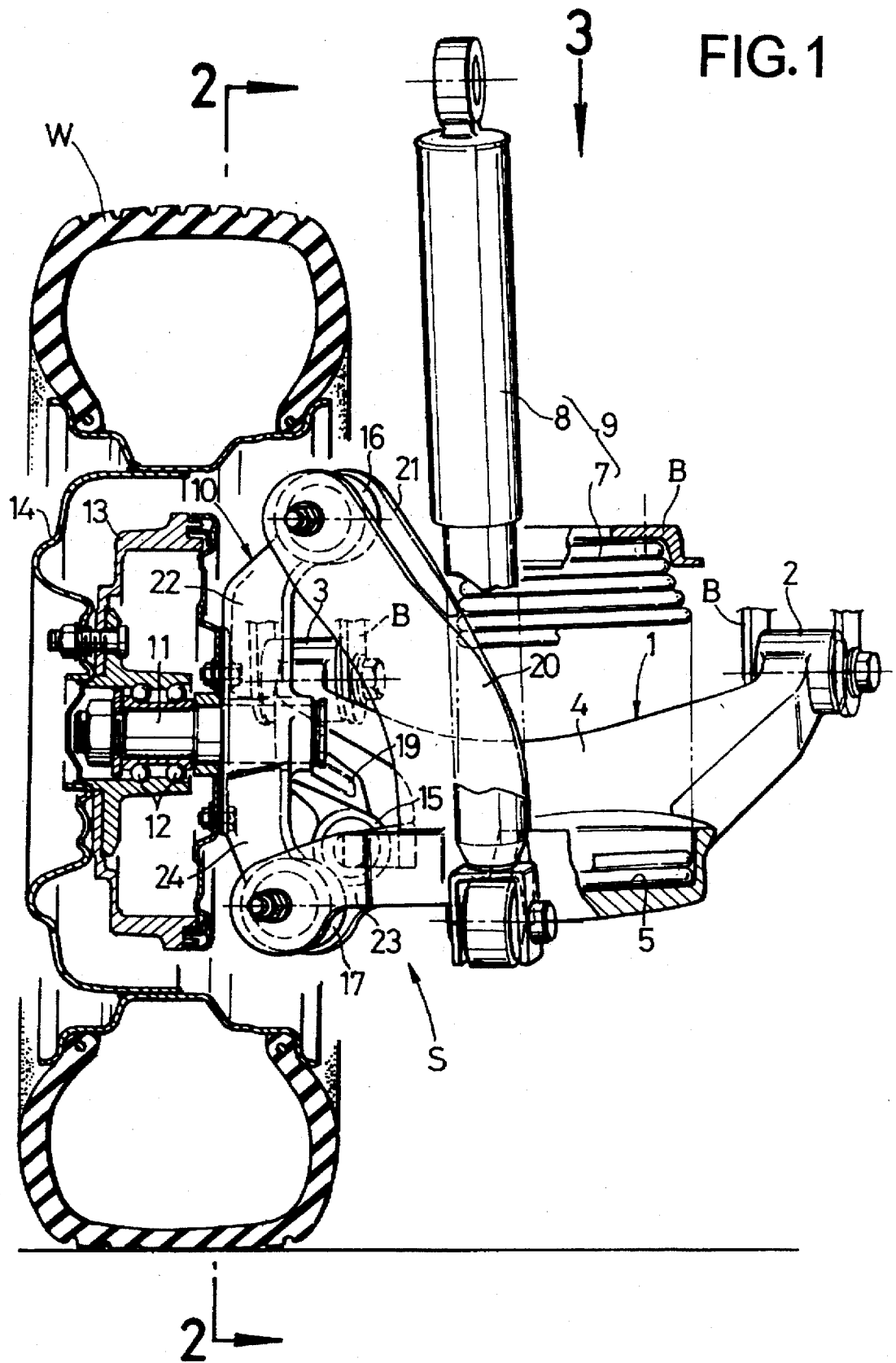
FIG. 1 is a back view of a suspension system for a left rear wheel according to a first embodiment of the present invention.
Figure 2:
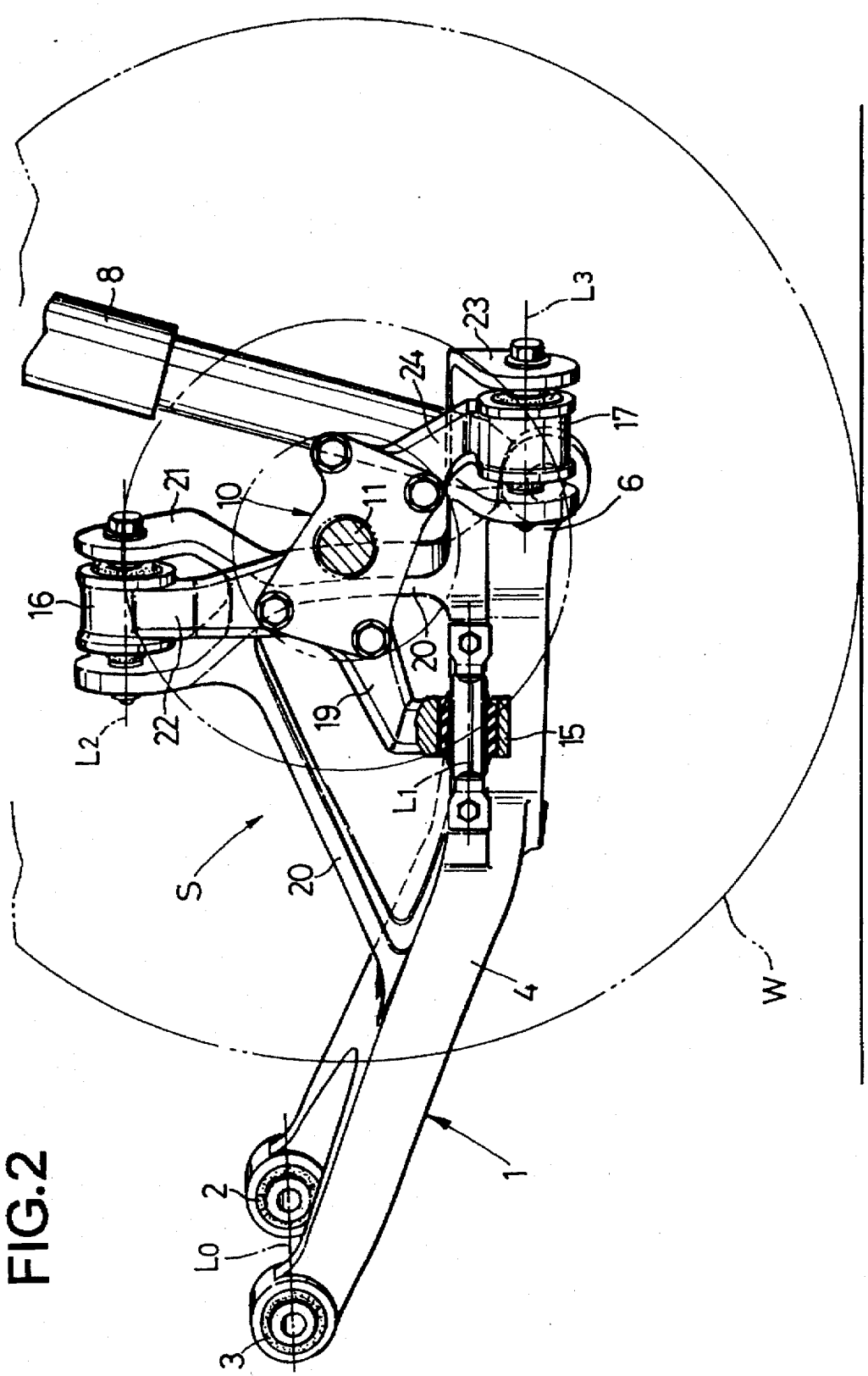
FIG. 2 is a view taken along a line 2—2 in FIG. 1.
Figure 3:
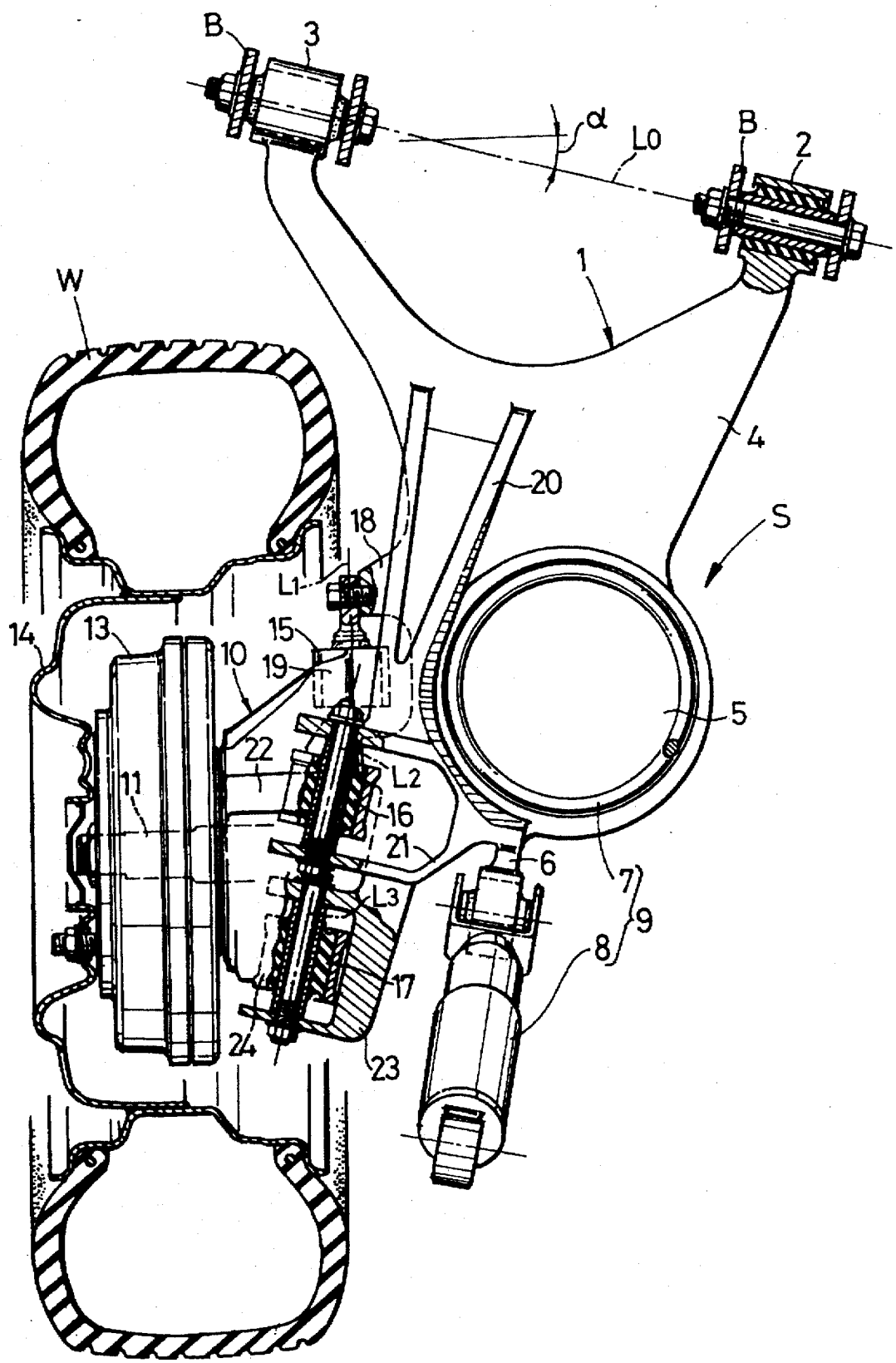
FIG. 3 is a view taken in a direction of an arrow 3 in FIG. 1.

Referring to FIGS. 1 to 3, there is shown an embodiment of a semi-trailing arm type suspension to which the present invention is applied. A suspension system S for supporting wheels W on a vehicle body B includes a trailing arm 1. A front portion of the trailing arm 1 is pivotally supported on a portion of the vehicle body B for vertically swinging movement through a pair of left and right rubber bush or bushing joints 2 and 3. The pair of left and right rubber bush joints 2 and 3 have a common axis $I_0$. As shown in FIG. 3, an inner side of the common axis $I_0$ is inclined rearwardly of the vehicle body by angle α. That is, the trailing arm 1 is a so-called semi-trailing arm.

The trailing arm 1 has a substantially plate-like body portion 4, and a spring seat 5 and a damper-mounting bracket 6 are mounted at a rear portion of the body portion 4. The spring seat 5 and the vehicle body B are interconnected by a suspension spring 7, and the damper-mounting bracket 6 and the vehicle body B are interconnected by a damper 8. The suspension spring 7 and the damper 8 constitute a buffer means 9 for buffering the vertical or up-and-down movement of the wheel W. A hub 13 is rotatably supported through ball bearings 12 on an axle 11 which is fixed to knuckle 10, and a rim 14 of the wheel W is fixed to the hub 13.

The knuckle 10 is connected to the trailing arm 1 through three rubber bush or bushing joints 15, 16, 17. The first rubber bush joint 15 disposed in front of and below the axle 11 connects a support portion 18 formed into a bifurcated configuration on the body portion 4 of the trailing arm 1 with an arm 19 formed on the knuckle 10. The second rubber bush joint 16 disposed above the axle 11 connects a support portion 21 formed into a bifurcated configuration at upper ends of two posts 20, 20 for the body portion 4 of the trailing arm 1 with an arm 22 formed on the knuckle 10. The third rubber bush joint 17 disposed in back of and below the axle 11 connects a support portion 23 formed into a bifurcated configuration on the body portion 4 of the trailing arm 1 with an arm 24 formed on the knuckle 10. By disposing the rubber bush joints in this distributed manner below and above, in from of and in back of the axle 11, it is possible to ensure a camber rigidity of the wheel W.

As can be seen from FIG. 2, all of axes $L_1$, $L_2$ and $L_3$ of the first, second and third rubber bush joints 15, 16 and 17 are disposed in a longitudinal direction of the vehicle as seen in a side view. Also, as can be seen in FIG. 3, the axis $L_1$ of the first rubber bush joint 15 is disposed in the longitudinal direction of the vehicle, whereas rear sides of the axes $L_2$ and $L_3$ of the second and third rubber bush joints 16 and 17 are inclined outwardly of the vehicle body as seen in a plan view.

Any of the first, second and third rubber bush joints 15, 16 and 17 has a rigidity set such that the rigidity in the direction of the axis $L_1$, $L_2$, $L_3$ thereof is lower than that in a direction perpendicular to the axis $L_1$, $L_2$, $L_3$. Therefore, the knuckle 10 is movable in the longitudinal direction of the vehicle body relative to the trailing arm 1 by a relatively small load. The rigidity in the direction perpendicular to the axis $L_1$ of the first rubber bush joint 15 is set smaller than that in the direction perpendicular to the axis $L_3$ of the third rubber bush joint 17. The second and third rubber bush joints 16 and 17 have their rigidity set at the same level.

The operation of the embodiment of the present invention having the above-described construction will be described below.

When the wheel W runs upon a small stone or projection during traveling of the vehicle, an upward load component acting on the wheel W is absorbed by the expansion and contraction of the suspension spring 7 and the damper 8. A load component in a rearward direction of the vehicle is absorbed by the deformation of the two rubber bush joints 2 and 3 connecting the trailing arm 1 to the vehicle body B and by the deformation of the three rubber bush joints 15, 16 and 17 connecting the trailing arm 1 and the knuckle 10. At this time, the wheel W and the knuckle 10 can be easily moved in the longitudinal direction of the vehicle body relative to the trailing arm 1, because the three rubber bush joints 15, 16 and 17 are disposed with their axes $L_1$, $L_2$ and $L_3$ turned substantially in the longitudinal direction of the vehicle body, and the rigidity of the rubber bush joints 15, 16, 17 in the longitudinal direction of the vehicle body is set lower than that in the direction perpendicular to the axes $L_1$, $L_2$, $L_3$. This results in an increased longitudinal compliance to provide an enhanced riding comfort. Further, the load component in the rearward direction of the vehicle is not applied to the damper 8 and hence, it is possible to eliminate an undesirable influence of damper friction.

Figure 4:
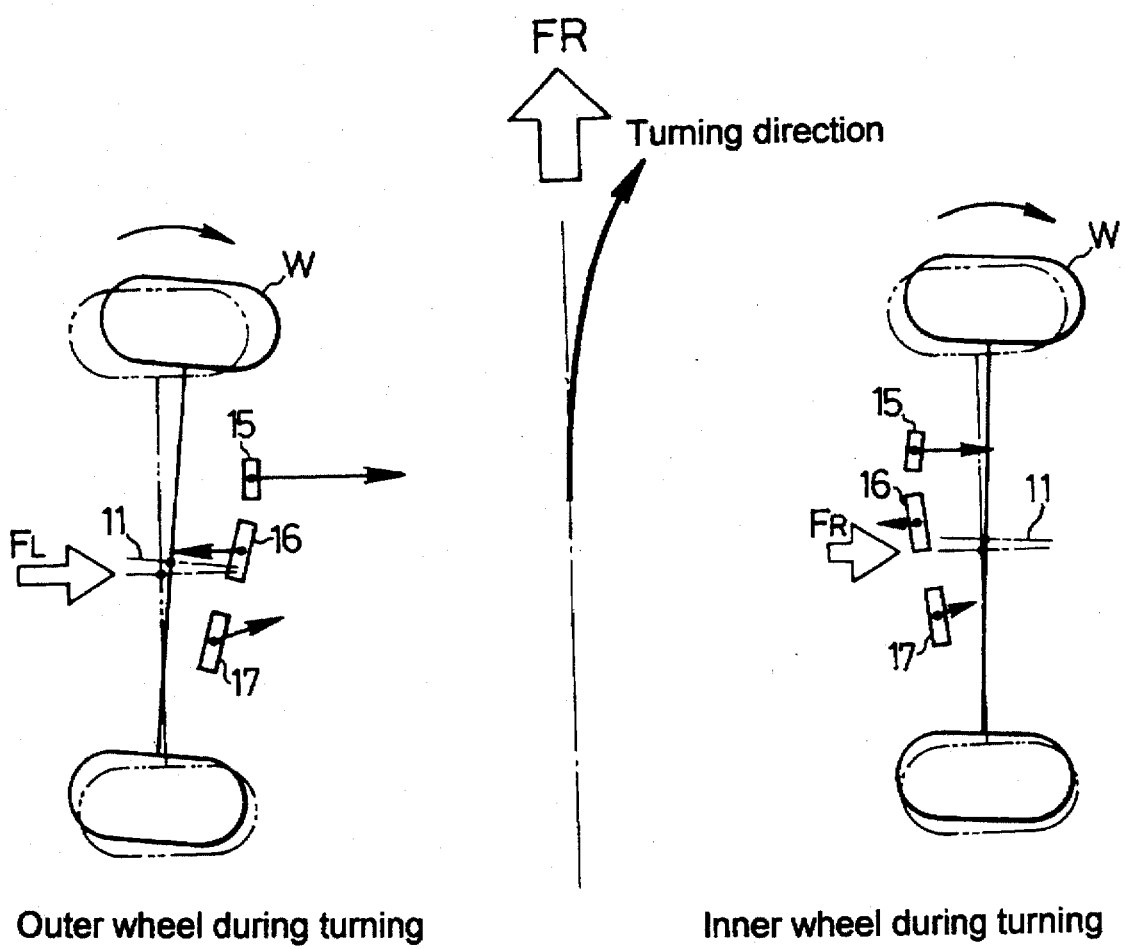
FIG. 4 is a diagrammatic illustration for explaining the operation during turning of the vehicle.

When the vehicle is turned, for example, rightwardly, as shown in FIG. 4, the vehicle is swung leftwardly (i.e., outwardly in a turning direction) by a centrifugal force. Therefore, a side force $F_L$ directed from the outside to the inside of the vehicle is applied to the left wheel W which is an outer wheel with a larger grounding load as viewed in the turning direction, while a side force $F_R$ directed from the inside to the outside of the vehicle body is applied to the right wheel W which is an inner wheel with a smaller grounding load as viewed in the turning direction.

When the side force $F_L$ is applied to the left wheel W which is the outer wheel as viewed in the turning direction, the knuckle 10 is largely displaced inwardly of the vehicle body at the position of the first rubber bush joint 15, because of its relatively low rigidity in the direction perpendicular to the axis $L_1$ of the first rubber bush joint 15 located in from of the axle 11. The knuckle 10 is displaced to a smaller extent inwardly of the vehicle body at the position of the third rubber bush joint 17, because of its relatively high rigidity in the direction perpendicular to the axis $L_3$ of the third rubber bush joint 17 located in back of the axle 11. As a result, the left wheel W which is the outer wheel as viewed in the turning direction is towed inwardly, as shown by a solid line in FIG. 4. At this time, the second rubber bush joint 16 is deformed in an opposite direction from that of the first and third rubber bush joints 15 and 17, because it is located substantially above the axle 11. However, the deformation of the second rubber bush joint 16 located substantially above the axle 11 exerts little influence to the inward and outward towing.

When the side force $F_R$ is applied to the right wheel W which is the inner wheel as viewed in the turning direction, the knuckle 10 is largely displaced outwardly of the vehicle body at the position of the first rubber bush joint 15 of lower longitudinal rigidity located in front of the axle 11, and is displaced to a smaller extent outwardly of the vehicle body at the position of the third rubber bush joint 17 located in back of the axle 11. As a result, the right wheel which is the inner wheel as viewed in the turning direction is towed outwardly, as shown by the solid line in FIG. 4. Even in this case, the deformation of the second rubber bush joint 16 exerts little influence to the inward and outward towing.

Thus, the left and right wheels are steered in the turning direction of the vehicle by the side force produced with the turning, and moreover, the outer wheel as viewed in the turning direction with the grounding load increased by the centrifugal force is towed inwardly to the larger extent than the inner wheel, leading to an enhanced stability during turning of the vehicle. Similarly, when the vehicle is turned counterclockwise, rather than clockwise as shown in FIG. 4, the left and right wheels W, W are also steered in the turning direction of the vehicle, leading to an enhanced stability during turning of the vehicle.

Figure 5:
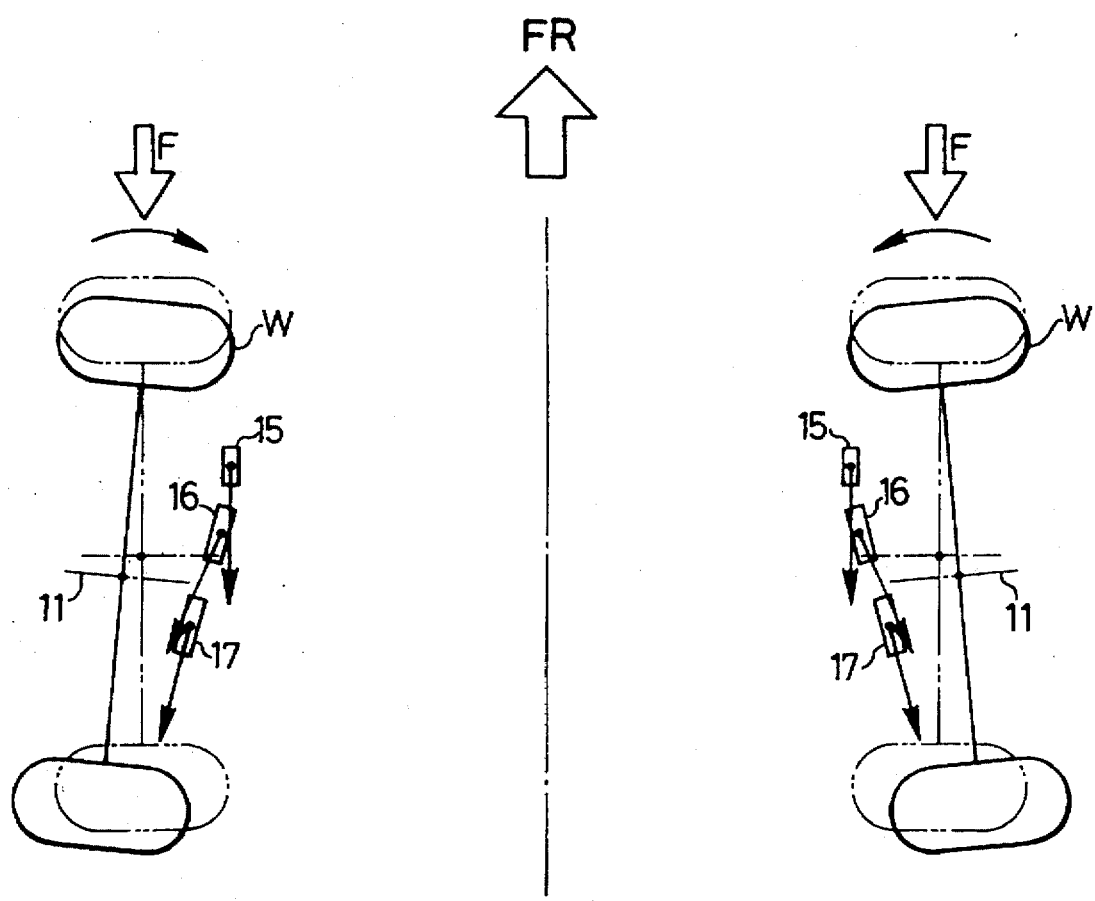
FIG. 5 is a diagrammatic illustration for explaining the operation during braking.

When a braking force F is applied to the left and right wheels W, W by braking, as shown in FIG. 5, the knuckle 10 is displaced rearwardly of the vehicle body at the position of the first rubber bush joint 15 located in front of the axle 11, but displaced obliquely in a rearward and outward direction of the vehicle body at the positions of the second and third rubber bush joints 16 and 17 located above and in back of the axle 11. As a result, any of the left and right wheels W, W are towed inwardly to the position shown by the solid line, leading to an enhanced stability during braking.

Figure 6:
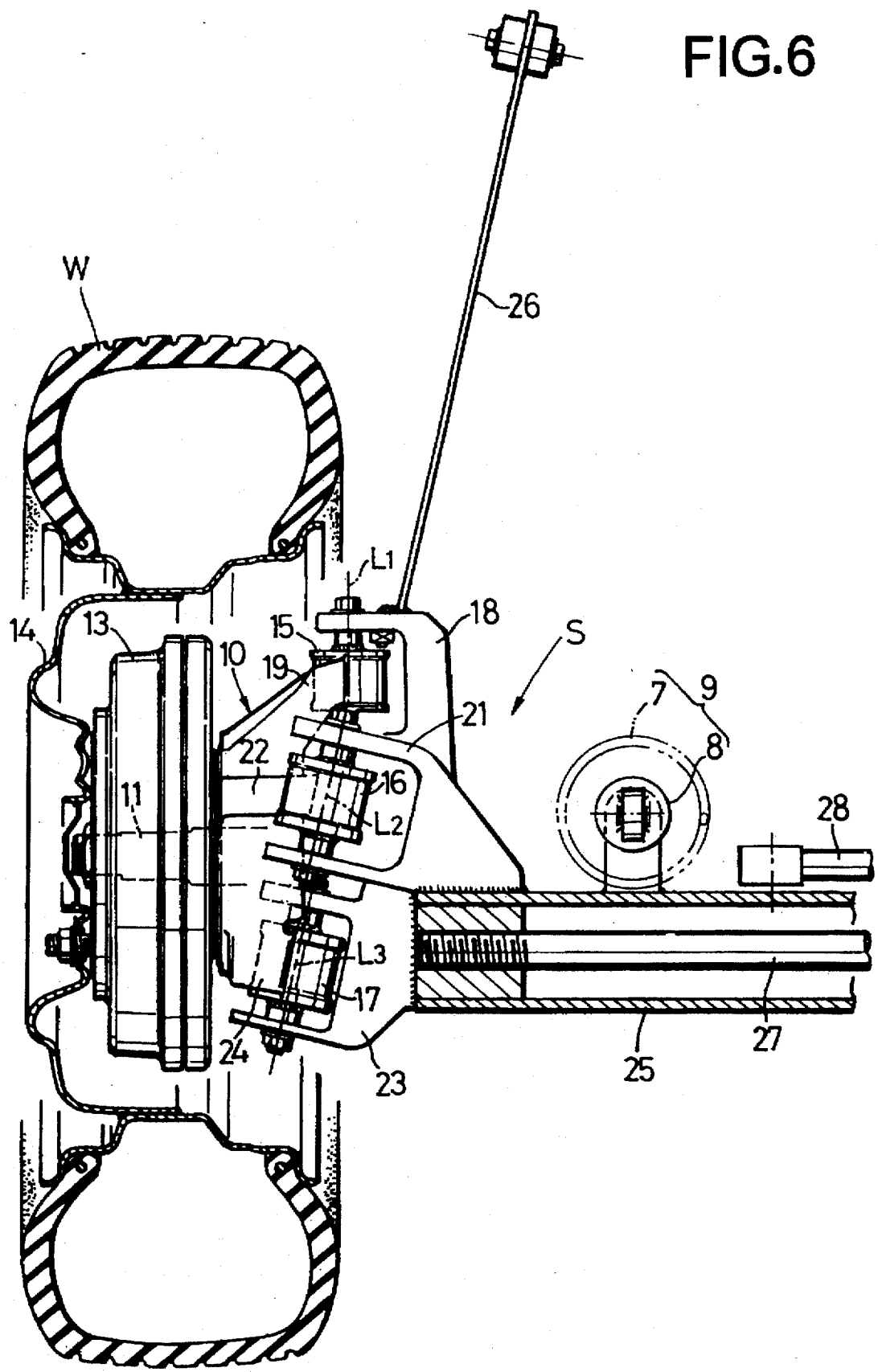
FIG. 6 is a view similar to FIG. 3, but according to a second embodiment.

A second embodiment of the present invention will be described below with reference to FIG. 6, wherein portions or members corresponding to those in the first embodiment are designated by like reference characters.

The second embodiment of the present invention is applied to a torsion beam type suspension. An axle beam 25 is disposed laterally of the vehicle body and vertically movably supported at its left and right opposite ends by a buffer means 9 including a suspension spring 7 and a damper 8 which are disposed coaxially. Support portions 18, 21 and 23 are provided at left and right opposite ends of the axle beam 25. The support portion 18 at the front end of the axle beam 25 and the vehicle body B are interconnected by a trailing arm 26 which limits the longitudinal movement of the axle beam 25. Reference character 27 is a stabilizer which is adapted to be twisted due to a difference in phase between vertical movements of the left and right wheels W, W to generate a restoring force, and reference character 28 is a lateral rod for limiting the lateral movement of the axle beam 25, while permitting the vertical movement of the axle beam 25.

The support portions 18, 21 and 23 of the axle beam 25 are connected with the knuckle 10 by three rubber joints 15, 16 and 17. The arrangement, structure and rigidity-distribution of the three rubber bush or bushing joints 15, 16 and 17 are the same as in the first embodiment.

Even in the second embodiment, it is possible to ensure a longitudinal compliance, a stability during turning of the vehicle and a stability during braking, as in the first embodiment.

Although the presently preferred embodiments of the present invention have been described in detail, it will be understood that the present invention is not limited to the above-described embodiments, and that various modifications in design may be made without departing from the spirit and scope of the invention defined in claims.

For example, although the trailing arm 1 in the first embodiment is the semi-trailing arm inclined at the angle a with respect to the lateral direction of the vehicle body, the present invention is also applicable to a full-trailing arm (the angle α is 0°) in place of the semi-trailing arm. The axis $L_2$ of the second rubber bush joint 16 may be disposed in the longitudinal direction of the vehicle body as viewed in a plane, and the rigidity in the direction perpendicular to the axis $L_2$ may be set as desired.

What is claimed is:

1. A suspension system for a vehicle, comprising:
   a knuckle rotatably supporting a wheel through an axle;
   a suspension member connecting the knuckle to a vehicle body; and
   buffer means for buffering a vertical movement of said suspension member, wherein said knuckle is connected to said suspension member by at least one front-side elastomeric bushing disposed in front and at least one rear-side elastomeric bushing disposed in back of the axle, axes of said at least two bushings being disposed to extend in substantially a longitudinal direction of the vehicle body as seen in a side view of the vehicle body, a rigidity of said rear-side elastomeric bushing in a direction perpendicular to the axis of said rear-side elastomeric bushing being set higher than said front-side elastomeric bushing in a direction perpendicular to the axis of said front-side elastomeric bushing; and
   wherein said rear-side elastomeric bushing is inclined outwardly of the vehicle body from a front end to a rear end thereof as seen in plan view of the vehicle body.

2. A suspension system for a vehicle according to claim 1, wherein an axial rigidity of each of said elastomeric bushings is set lower than the rigidity in the direction perpendicular to the axis thereof.

3. A suspension system for a vehicle according to claim 1, wherein said elastomeric bushings are located below said axle, and said suspension system further includes another elastomeric bushing mounted above the axle and having an axis which is directed in the longitudinal direction of said vehicle body as seen in a side view.

4. A suspension system for a vehicle according to claim 1, wherein said suspension member is one of a trailing arm, a semi-trailing arm and a torsion beam.

5. A suspension system for a vehicle according to claim 1, wherein said buffer means comprises a damper and a spring connected between said suspension member and the vehicle body.

6. A suspension system for a vehicle, comprising:
   a knuckle rotatably supporting a wheel through an axle;
   a suspension member connecting the knuckle to a vehicle body;
   buffer means for buffering vertical movement of said suspension member; and bushing joint means connecting said suspension member to said knuckle, said bushing joint means being resilient in a longitudinal direction of the vehicle body such that said knuckle is moveable in the longitudinal direction relative to said suspension member by a relatively small load applied to the wheel; and
   said bushing joint means comprises at least one front-side elastomeric bushing disposed in front of the axle and at least one rear-side elastomeric bushing disposed in back of the axle, axes of said elastomeric bushings extend in substantially the longitudinal direction of the vehicle body as seen in a side view of the vehicle body, said rear-side elastomeric bushing being inclined outwardly of the vehicle body from a front end to a rear end thereof as seen. in a plan view of the vehicle body.

7. A suspension system for a vehicle according to claim 6, wherein a lateral rigidity of said rear-side elastomeric bushing is greater than a lateral rigidity of said front-side elastomeric bushing.

8. A suspension system for a vehicle according to claim 7, wherein an axial rigidity of each of said elastomeric bushings is set lower than a rigidity thereof in a direction perpendicular to the axis of each said bushing.

9. A suspension system for a vehicle according to claim 8, wherein the axis of said rear-side elastomeric bushing is inclined outwardly of the vehicle body from a front end to a rear end thereof.

10. A suspension system for a vehicle according to claim 9, wherein said elastomeric bushings are also disposed below said axle, and said bushing joint means further includes another elastomeric bushing mounted above the axle.

11. A suspension system for a vehicle according to claim 6, wherein an axial rigidity of each of said elastomeric bushings is lower than a rigidity thereof in a direction perpendicular to the axis of each said bushing.

12. A suspension system for a vehicle according to claim 6, wherein said elastomeric bushings are also disposed below said axle.

13. A suspension system according to claim 12, wherein said bushing joint means further includes an elastomeric bushing disposed above said axle.

14. A suspension system according to claim 13, wherein said elastomeric bushing disposed above the axle has an axis extending substantially in the longitudinal direction of the vehicle body as seen in a side view of the vehicle body.

15. A suspension system for a vehicle according to claim 6, wherein said buffer means comprises a damper and a spring connected between said suspension member and the vehicle body.

* * * * *

UNITED STATES PATENT AND TRADEMARK OFFICE
CERTIFICATE OF CORRECTION

PATENT NO. : 5,685,556
DATED : 11 November 1997
INVENTOR(S) : Hideaki Shibue, Toshiharu Yoshioka, Hideki Mizutani It is certified that error appears in the above-indentified patent and that said Letters Patent is hereby corrected as shown below:

Column 2, 29th line, change "brig" to --braking--;
         line numbered 52, change ";." to --;--.
Column 3, line 8, change "fight" to --right--;
         line 9, change "I$_o$" to --L$_o$--;
         line 10, change "I$_o$" to --L$_o$--;
         line numbered between 40 & 41, change "from" to --front--.
Column 4, 17th line, change "tiding" to --riding--;
         line numbered approximately 36, change "from" to --front--;
         line 51, change "fight" to --right--;
         line 58, change "fight" to --right--;
         line 63, change "fight" to --right--.
Column 5, line 4, change "fight" to --right--;
         line 7, change "fight" to --right--;
         line numbered approximately 55, change "angle a" to --angle $\alpha$--.
Column 6, line 55, after "seen" delete the period.

Signed and Sealed this

Tenth Day of February, 1998

Attest:

BRUCE LEHMAN

Attesting Officer

Commissioner of Patents and Trademarks